(12) United States Patent
Jessen

(10) Patent No.: US 7,954,573 B2
(45) Date of Patent: Jun. 7, 2011

(54) DRIVE-STEERING CONTROL SYSTEM AND VEHICLES EQUIPPED THEREWITH

(76) Inventor: Thomas F. Jessen, Valparaiso, IN (US)

( * ) Notice: Subject to any disclaimer, the term of this patent is extended or adjusted under 35 U.S.C. 154(b) by 173 days.

(21) Appl. No.: 12/349,674

(22) Filed: Jan. 7, 2009

(65) Prior Publication Data
US 2010/0003872 A1     Jan. 7, 2010

Related U.S. Application Data

(60) Provisional application No. 61/019,365, filed on Jan. 7, 2008.

(51) Int. Cl.
*B60K 26/00* (2006.01)
(52) U.S. Cl. .................... 180/6.32; 56/11.3
(58) Field of Classification Search .................. 180/6.32, 180/6.4, 6.48; 56/11.3
See application file for complete search history.

(56) References Cited

U.S. PATENT DOCUMENTS

| | | | |
|---|---|---|---|
| 4,669,590 A * | 6/1987 | Zindler et al. | 192/17 R |
| 5,809,755 A * | 9/1998 | Velke et al. | 56/10.8 |
| 5,913,802 A | 6/1999 | Mullet et al. | |
| 5,947,866 A * | 9/1999 | Nagashima | 477/200 |
| 6,490,849 B1 | 12/2002 | Scag et al. | |
| 6,604,757 B1 | 8/2003 | Huang | |
| 6,729,115 B2 | 5/2004 | Bartel | |
| 6,827,174 B2 | 12/2004 | Chernoff et al. | |
| 6,912,831 B2 | 7/2005 | Velke et al. | |
| 7,299,610 B2 | 11/2007 | Piontek | |

* cited by examiner

*Primary Examiner* — Tony H. Winner
(74) *Attorney, Agent, or Firm* — Hartman & Hartman, P.C.; Gary M. Hartman; Domenica N. S. Hartman (57) ABSTRACT

A drive-steering control system suitable for off-road land and amphibious vehicles. The system includes first and second steering input levers, each operable to rotate in forward and rearward pivotal directions. A coupling mechanism converts and transmits rotation of the first steering input lever in the forward pivotal direction into rotation of the second steering input lever in the rearward pivotal direction, and vice-versa. A reducing mechanism operates to selectively reduce the propulsion outputs of first and second propulsion devices, and a converting mechanism operates to convert the rotations of the steering input levers into inputs to the reducing mechanism. Depending on the directions the steering input levers are rotated, the reducing mechanism reduces the propulsion output of either the first or second propulsion device, which causes either the lefthand or righthand side of the vehicle to travel at a lower speed and thereby turn the vehicle either left or right.

27 Claims, 7 Drawing Sheets

DRIVE-STEERING CONTROL SYSTEM AND VEHICLES EQUIPPED THEREWITH

CROSS REFERENCE TO RELATED APPLICATIONS

This application claims the benefit of U.S. Provisional Application No. 61/019,365, filed Jan. 7, 2008, the contents of which are incorporated herein by reference.

BACKGROUND OF THE INVENTION

The present invention generally relates to vehicle steering systems suitable for use with off-road, amphibious, and water vehicles that are propelled by two or more propulsion devices, such as drive wheels, drive tracks, propellers, etc. More particularly, the present invention relates to a vehicle steering control system that utilizes two synchronized steering input levers in a steer-by-driving propulsion system.

Ride-on self-propelled lawn care equipment, such as fertilizer and herbicide spreaders, are known and commercially available. A notable example is the Permagreen Ride-On Magnum, available from Permagreen Supreme Inc. and depicted in FIG. 1. As evident from FIG. 1, the Permagreen Ride-On Magnum utilizes an articulated steering system in which turning of the vehicle 10 occurs as a result of its front end 12 (with drive wheels 14) being physically turned with the handle bar 16, causing the motorized front end 12 to articulate relative to a trailing sulky 18. Articulated steering systems of this type usually depend entirely on an operator's muscle power to steer the vehicle. For example, U.S. Pat. No. 6,336,600 to Jessen discloses a self-propelled fertilizer spreader vehicle with an articulated steering control system, in which a front section of the vehicle is pivotally connected to a rear section and steered by changing the angle of the pivotal connection.

Aside from systems that control the steering angle of steering wheels (for example, conventional automobile steering systems), another type of steering system widely found in lawn care equipment is the steer-by-driving (drive-wheel steering) system. Also widely used on a variety of off-road and amphibious vehicles, steer-by-driving systems operate by controlling the relative rotation speed of at least two drive means (wheels, tracks, or other propulsion devices) to cause the vehicle to turn to the side of the slower rotating drive means. Such steer-by-driving systems are well known in the art, and include, but are not limited to, controlled differential steering, clutch-brake steering, and independent wheel-motor steering units. Controlled differential steering units generally comprise a differential that operably connects lefthand and righthand drive wheels or tracks and selectively-operable brakes that retard the rotation of one of the drive means. Examples include bulldozers and multi-wheeled vehicles such as skid steer loaders. In clutch-brake steering units, lefthand and righthand drive wheels are operably connected by selectively operable clutches with or without brakes for retarding the rotation of one of the drive wheels. A common example of this type of steering unit can be found in commercial lawn mowers and the like. Finally, in independent wheel-motor steering, each drive wheel is operably mounted directly to an electric or hydraulically driven wheel-motor or variable-displacement hydrostatic transmission that can be selectively-controlled to retard the rotation of either drive wheel. A common example of this type of steering unit is the zero-turning radius lawn mowers and the like.

U.S. Pat. No. 5,913,802 to Mullet et al. discloses a tiller or single-lever steering device for a drive-wheel steering system on a zero-turn-radius lawn mower. Single-lever steering devices, for example, the handlebars of tricycles and bicycles, are widely used and enable the user to become quickly proficient at operating other vehicles with single-lever steering. Both hands can remain on the lever (handlebar) for support, or one hand may be removed while the other hand still provides full steering control. Another advantage of single-lever steering devices is their compact size, which can minimize the overall size of the vehicle. Single-lever steering devices are also common on personal watercraft, personal recreational vehicles such as ATVs, amphibious vehicles, lawn and garden vehicles, and the like. In addition to drive-wheel steering systems such as Mullet et al., single-lever steering systems can be connected to a variety of other vehicle steering systems, including linkage-steering and direct-steering (for example, bicycles) systems.

While having the above-noted advantages, single-lever steering devices have known shortcomings. For example, the tiller motion of the lever may force the operator's body out of optimal alignment with the vehicle, such as when making a sharp high-speed turn, in which case the operator's body should lean to the inside of the turn for balance while the tiller must be orientated to the outside of the turn. Furthermore, vertically-orientated steering shafts common to single-lever steering devices may restrict entry to the vehicle and interfere with the placement of other vehicle components. Without some form of power-assist, the forces required to move the lever can fatigue the operator and often limit the size of the vehicle that can be controlled with a single-lever steering device.

Two-lever steering devices are also known. Conventional two-lever steering devices use two independently operable levers, normally arranged side by side, which move fore and aft in relationship to the vehicle. Conventional two-lever steering systems are commonly used to control differential steering systems, clutch-brake steering systems, steering systems utilizing twin independent variable-displacement hydraulic pumps and fixed-displacement hydraulic wheel motors, and twin variable-displacement hydrostatic transmission steering systems. Two-lever steering devices are commonly used with drive-wheel steering control systems found on walk-behind, sit-on, stand-on, skid steer, and stand-on/walk-behind vehicles.

Conventional two-lever steering input device systems also have known shortcomings. When used on walk-behind, stand-on, and stand-on/walk-behind vehicles as disclosed in U.S. Pat. No. 6,490,849 to Scag and U.S. Pat. No. 6,912,831 to Velke, a fixed support bar must be provided so the operator can maintain a firm grip on the vehicle. However, the operator is often required to loosen his/her grip on the fixed support bar while operating the steering levers, which can compromise operator stability and safety. Two-lever steering has been adapted to control differential steering systems used extensively in tracked vehicles, such as bulldozers and tanks, to provide an easy way to steer a heavy vehicle by braking the track on one side of the vehicle while the power is transmitted through a differential to continue turning the track on the other side at a higher speed. Typically, independently operable right and left handles control the brakes. While controlled differential steering systems perform well when the operator is sitting, in the case of a stand-up operator position such as on ride-on self-propelled lawn care equipment, additional structure is necessary to provide the operator with stable support. For example, a fixed support bar may be necessary so that the operator can maintain a firm grip on the vehicle for both vehicle control and operator stability and safety over rough and hilly terrain. Even then, the constant use of the fingers to operate the steering levers can cause fatigue and strain on the hands and arms, and accelerations and decelerations can cause the operator's arms on the steering levers to apply a reverse input to the steering system. A one-hand steering capability to free one hand of the operator is not practical unless the two levers are closely orientated to permit one hand to operate both levers. However, close placement of both levers may restrict entry onto the vehicle or in otherwise interfere with the operator or the location of other components, necessitating the use of burdensome and complicated means to reposition the levers as disclosed in U.S. Pat. Nos. 7,299,610 to Piontek and 6,729,115 to Bartel. Lastly, conventional two-lever steering input devices are less instinctive to use, requiring a lengthy learning curve before an inexperienced operator becomes proficient in its operation.

Another example of a two-lever steering device is disclosed in U.S. Pat. No. 6,604,757 to Huang as installed in a conventional automobile steering wheel system. Two counter-operating steering levers are connected to a linkage steering system to adjust the steering angle of the front wheels of a beach motorized vehicle. A more complicated two-lever steering device for a conventional steering wheel system is disclosed in U.S. Pat. No. 6,827,174 to Chernoff et al. In Chernoff et al., right and left control posts (levers) mechanically communicate with each other so as to operate in opposite directions by means of gears, etc. The posts send non-mechanical steering signals to a steer-by-wire system to adjust the steering angle of the steering wheels of a vehicle. Chernoff et al. also disclose separate demand-input mechanisms on the posts to control other vehicle control systems, for example, nonmechanical accelerator and braking signals. Unfortunately, steer-by-wire systems require expensive and complicated electronic control systems, as well as expensive and complicated actuators to transform the electrical signals into mechanical motion capable of operating the steering device. As such, steer-by-wire systems tend to be impractical for use on anything less than mass production vehicles.

BRIEF DESCRIPTION OF THE INVENTION

The present invention provides a synchronized two-lever drive-steering control system suitable for off-road land and amphibious vehicles. The two levers are synchronized to be counter-operating steering input levers capable of providing a vehicle operator with convenient intuitive steering as well as firm support, which is particularly advantageous when operating vehicles intended for off-road and amphibious use on rough surfaces, such as rough and hilly terrains.

The drive-steering control system includes first and second steering input levers, each operable to rotate in forward and rearward pivotal directions relative to the vehicle. A coupling means converts and transmits rotation of the first steering input lever in the forward pivotal direction into rotation of the second steering input lever in the rearward pivotal direction, and rotation of the second steering input lever in the forward pivotal direction into rotation of the first steering input lever in the rearward pivotal direction. The coupling means prevents the first and second steering input levers from being simultaneously rotated in the forward pivotal direction or simultaneously rotated in the rearward pivotal direction. A reducing means operates to reduce propulsion outputs of a first means for propelling a lefthand side of the vehicle and a second means for propelling a righthand side of the vehicle, and a converting means operates to convert the rotations of the first and second steering input levers into inputs to the reducing means. The reducing means reduces the propulsion output of the first propelling means when the first steering input lever is rotated in the rearward pivotal direction, so that the lefthand side of the vehicle travels at a speed lower than the righthand side of the vehicle and the vehicle turns in a lefthand direction relative to the forward and rearward directions. In addition, the reducing means reduces the propulsion output of the second propelling means when the second steering input lever is rotated in the rearward pivotal direction, so that the righthand side of the vehicle travels at a speed lower than the lefthand side of the vehicle and the vehicle turns in a righthand direction relative to the forward and rearward directions.

The drive-steering control system of this invention is well suited for power-driven off-road, amphibious, and water vehicles that are often operated under strenuous conditions, especially off-road vehicles operated on rough and hilly terrains, that pose a greater risk in terms of vehicle control and operator stability and safety. The first and second steering input levers are coupled, for example, mechanically or hydraulically, to each other so that the motion of one of the levers causes the other lever to move equally in the opposite direction, while equal force applied to the levers in the same direction does not move the levers or have any effect on the steering of the vehicle. As such, the steering input levers can be used by the operator for support and stability. Because the drive-steering control system is well-adapted for one-hand operation, the system can be used by certain disabled individuals, and can even be configured for hands-free operation, for example, as a foot-operated drive-steering control system. Alternatively, the drive-steering control system can be configured as a two-hand or two-foot operated system.

The drive-steering control system can replace a number of conventional steering input devices including, but not limited to, steering wheels and single-lever and two-lever input devices commonly used on off-road, amphibious, and water vehicles. The steering input levers are in mechanical or hydraulic communication with at least one vehicle steering system to control the direction of travel of the vehicle. The vehicle steering system can be, but is not limited to, a variety of drive-wheel steering systems commonly used on a variety of off-road and amphibious vehicles, for example, the aforementioned controlled differential steering, clutch-brake steering, and independent wheel-motor steering units. Other steering systems that can be employed with the invention include, but are not limited to, linkage steering systems in which a linkage coupled to one or both levers selectively changes the position of a steering nozzle or wheels as embodied in personal watercraft and other vehicles, articulated steering systems in which the angular relationship between front and rear portions of the vehicle is selectively controlled, and combinations of these steering systems. As a particular but nonlimiting example, the drive-steering control system of this invention can be used in combination with the articulated-steering system disclosed in U.S. Pat. No. 6,336,600 to Jessen, whose contents relating to an articulated steering system are incorporated herein by reference. When used in combination with Jessen's articulated steering system, the steering input levers of this invention can be mechanically coupled with steering brakes on the front wheels of Jessen's vehicle, a differential can connect the drive wheels, and the connecting means can comprise steering bakes that selectively slow the drive wheel associated with the operated steering input lever as the differential continues turning the wheel associated with the other steering input lever at a higher speed.

As evident from the above, the drive-steering control system of this invention is capable of use on a variety of vehicles including, but is not limited to, power-driven land, water and amphibious vehicles employed for a wide variety of purposes. The vehicle can be configured to enable the operator to sit on, walk behind, stand on, and/or selectively stand on or walk behind the vehicle. The vehicle may incorporate any systems commonly or necessarily employed with the particular type of vehicle. For example, one or both steering input levers can be equipped with one or more operator input devices that mechanically or hydraulically communicate with one or more additional vehicle control systems, for example, a speed control device, forward and reverse control devices, and brakes.

Other aspects and advantages of this invention will be better appreciated from the following detailed description.

DETAILED DESCRIPTION OF THE INVENTION

Figure 1:
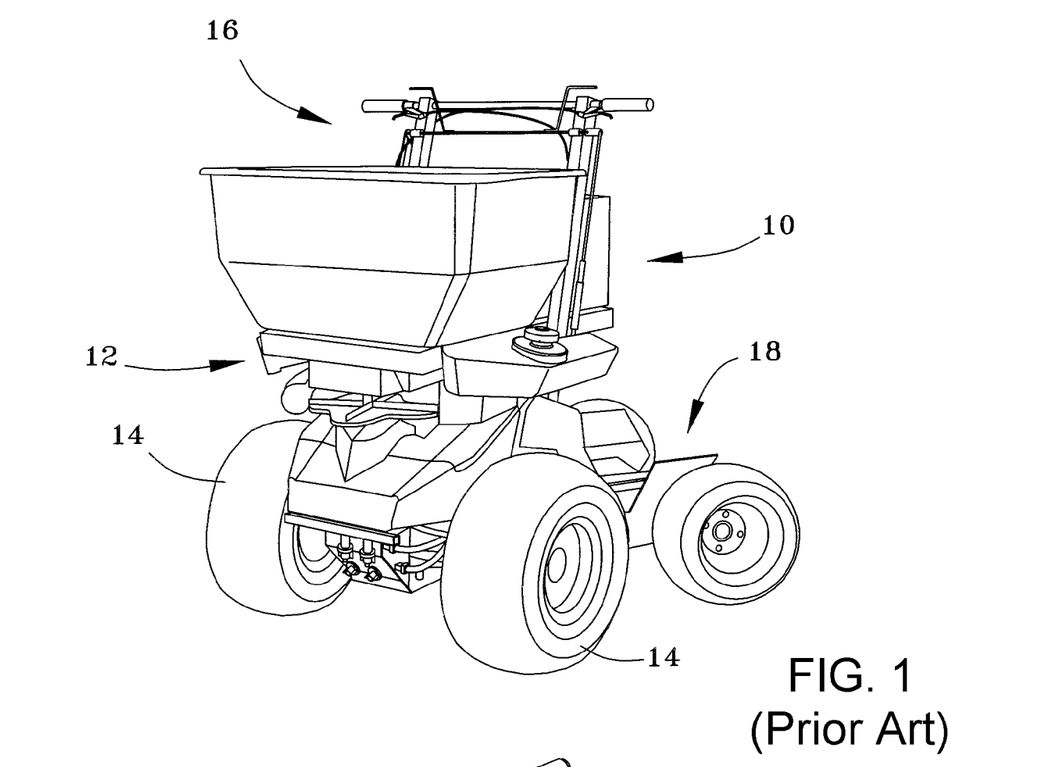
FIG. 1 is a perspective view of a ride-on self-propelled lawn care vehicle of a type known in the art.
Figure 2:
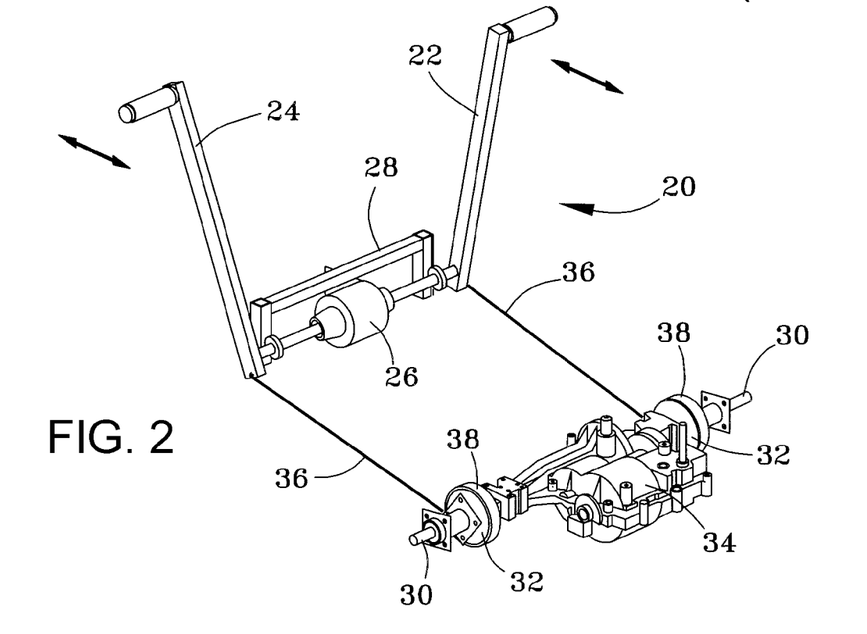
FIG. 2 is a schematic perspective view of a vehicle drive-steering control system in accordance with an embodiment of this invention, and capable of being used on the vehicle of FIG. 1.

An embodiment of a drive-steering control system 20 of this invention is schematically represented in FIG. 2. The drive-steering control system 20 is capable of use with a wide variety of vehicles, a non-limiting example of which is the Permagreen Ride-On Magnum represented in FIG. 1. Other types of vehicles within the scope of the invention include other commercial off-road land vehicles including other types of self-propelled lawn care vehicles, recreational land vehicles such as ATVs, amphibious vehicles capable of operation on both land and water, and surface and submersible watercraft intended for use on or in the water.

The control system 20 represented in FIG. 2 comprises lefthand and righthand steering input levers 22 and 24, respectively, and a coupling mechanism 26. The steering input levers 22 and 24 are configured to rotate in the forward and rearward directions of a vehicle on which the system 20 is installed, and the coupling mechanism 26 is adapted to cause the input levers 22 and 24 to be counter-rotating (counter-operating). More particularly, the coupling mechanism 26 converts and transmits the forward motion of one lever 22 or 24 into a rearward motion of the other lever 24 or 22, and the rearward motion of one lever 22 or 24 into a forward motion of the other lever 24 or 22. In the embodiment shown, the coupling mechanism 26 is an open differential of a type known in the art, and is adapted to be attached to a frame section 28 of a vehicle. Other types of coupling mechanisms capable of achieving counter-operation of the steering input levers 22 and 24 are foreseeable, some of which will be discussed in reference with the various embodiments of the invention.

For purposes of illustration, FIG. 2 represents the control system 20 as configured for installation on a vehicle having two front drive wheels. Notably, neither drive wheel is configured to be articulated by the operation of the steering input levers 22 and 24; in other words, the levers 22 and 24 do not cause a steering effect by changing the steering angles of the drive wheels. FIG. 2 represents a pair of wheel hubs 30 and brake drums 32 of types known in the art. The wheel hubs 30 are attached to each axle of a transmission 34 with an internal differential of any suitable type known in the art. Other types of wheel hubs, brake drums, and transmissions are also foreseeable, and the transmission 34 can receive power from any suitable source (not shown), such as an engine or motor. Each lever 22 and 24 is operably attached by way of a connecting rod or cable system 36 to a brake band 38 wrapped around a corresponding one of the brake drums 32. Various other means for connecting the levers 22 and 24 to the brake bands 38 and various other mechanisms for applying a braking action to the wheel hubs 30 are foreseeable.

Without any actuation of the levers 22 and 24, neither brake band 38 is engaged with its brake drum 32 and the vehicle travels in a straight line, either forward or reverse depending on the input to the transmission from a separate input device (not shown). The travel speed of the vehicle is also controlled by a separate input device (not shown). If a left turn is desired, the lefthand lever 22 is pulled toward the operator, which engages the lefthand brake band 38 with the lefthand brake drum 32, slowing the wheel (not shown) mounted to the lefthand hub 30. The internal differential within the transmission 34 continues transmitting power to the wheel (not shown) mounted on the righthand hub 30 and increases its speed. As a result, the vehicle turns to the left. If the righthand lever 24 is pulled, the procedure is reversed and the vehicle turns to the right.

According to a preferred aspect of the invention, the coupling mechanism 26 enables the vehicle to be steered using either lever 22 and 24 alone. For example, by pushing the lefthand lever 22 forward, the coupling mechanism 26 causes the righthand lever 24 to travel rearward and engage the righthand brake band 38 with the righthand brake drum 32. This capability enables the operator to steer the vehicle with one hand while the other hand is used to operate various other control levers of the vehicle.

If both levers 22 and 24 are simultaneously pulled rearward or pushed forward with equal force, neither lever 22 and 24 moves as a result of the synchronization effect of the coupling mechanism 26. As a result, neither brake is applied and the vehicle continues to travel in a straight line, and the operator can use the levers 22 and 24 for support and stability and acquire a feel for the terrain. The operator can hold onto the levers 22 and 24 while leaning backwards and bending down as may be necessary to avoid low-hanging branches, or leaning forward to transfer his/her weight to the front drive axle of the vehicle for increased traction, etc. While in that position, the operator can continue to steer the vehicle, which would otherwise be difficult to do without the steering control system 20 of this invention.

It can be appreciated that the steering control system 20 not only provides a simple and relatively inexpensive power-assist steering system, but it also provides increased safety and control to the vehicle. Furthermore, the system 20 retains the intuitive easy-to-learn features of current articulated and single-lever steering systems for ride-on self-propelled lawn care equipment, such as the aforementioned Permagreen Ride-On Magnum.

Figure 3:
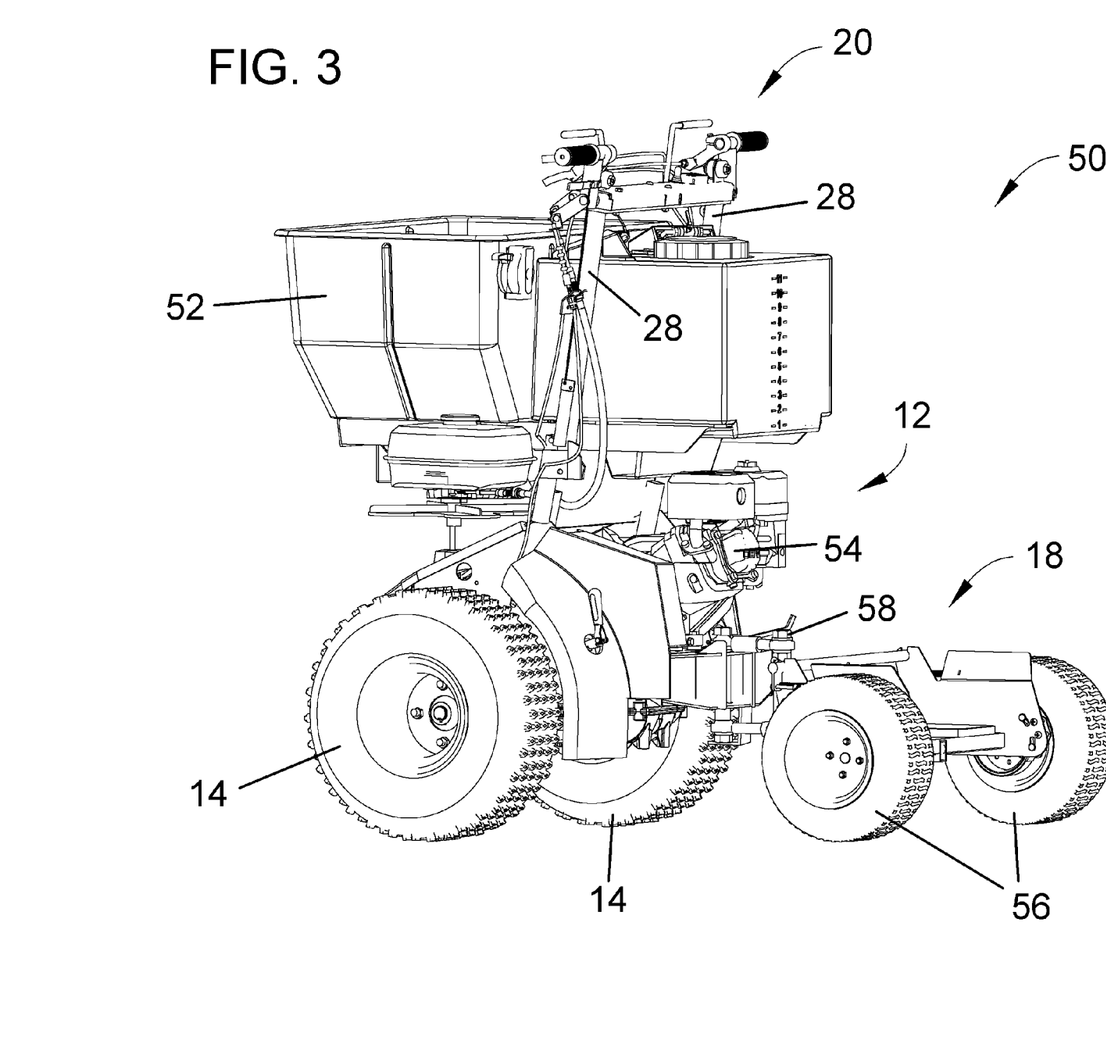
FIG. 3 is a perspective view of a ride-on self-propelled lawn care vehicle similar to that of FIG. 1 and on which a drive-steering control system of the type represented in FIG. 2 is installed.

FIG. 3 represents a ride-on self-propelled lawn care vehicle 50 similar to that of FIG. 1 and on which a drive-steering control system 20 of the type represented in FIG. 2 is installed, and FIGS. 4 through 7 depict subsystems of the control system in greater detail. For convenience, consistent reference numbers are used in FIGS. 3 through 7 to identify functionally similar elements to those of FIG. 2. The vehicle 50 is believed to be a preferred configuration for a self-propelled lawn care vehicle, in that the vehicle 50 is equipped with a sulky 18 coupled to the motorized front end 12 of the vehicle 50 with an articulating joint 58, and the vehicle 50 is configured to enable the vehicle's operator to selectively stand on or walk behind the sulky 18 while continuing to operate the control system 20. While the invention is particularly well suited for use on the vehicle 50 portrayed in FIG. 3, the control system 20 can be utilized on other types of vehicles, including but not limited to industrial vehicles, watercraft, military vehicles, powered wheel chairs, and other vehicles that can utilize a drive-wheel steering (steer-by-driving) system.

In the embodiment of FIGS. 3 through 7, which is believed to represent a preferred embodiment of the invention, the steering input levers 22 and 24 and a coupling mechanism 26 (not shown in FIG. 4) are mounted to a frame section 28 (or other part) of the vehicle 50. As better seen in FIG. 5, each lever 22 and 24 has a roughly horizontal upper handle portion 22A and 24A, a roughly horizontal shaft 22B and 24B rotatably assembled with the coupling mechanism 26, and a connecting portion 22C and 24C therebetween. The handle portions 22A and 24A of the levers 22 and 24 are equipped with hand grips 22D and 24D by which an operator grips and rotates (pivots) the levers 22 and 24 about the axis of the lever shafts 22B and 24B. The lever shafts 22B and 24B are offset and parallel within the coupling mechanism 26, and are equipped with synchronizing gears 22E and 24E that are in mesh. Also attached to each steering input lever 22 and 24 is a bellcrank 23 for a steering cable system 36, and a bracket 25 for mounting a limiter unit 40 discussed below. The levers 22 and 24, bellcranks 23, and brackets 25 can be assembled by welding or any other suitable assembly technique.

It should be apparent that the steering input levers 22 and 24 can be constructed of a variety of materials, assembled in any manner, and configured in size and shape as may be required to fulfil the intended purpose of the control system 20. Furthermore, the handle portions 22A and 24A can be fixed or adjustable to be extended, retracted, and orientated to provide the operator optimal comfort and convenience.

Figure 5:
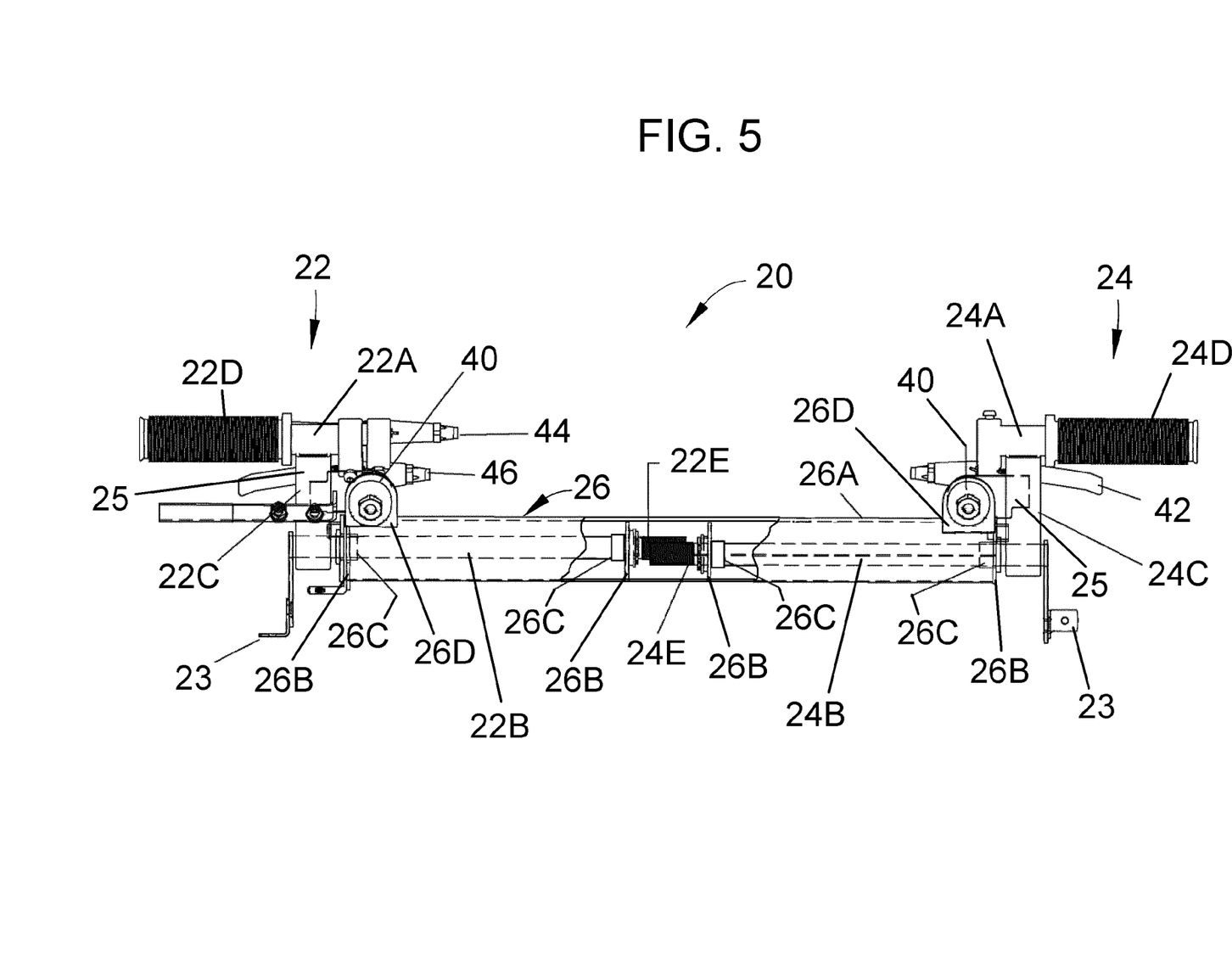
FIG. 5 is a rear view detailing the drive-steering control system of FIGS. 3 and 4.
Figure 6:
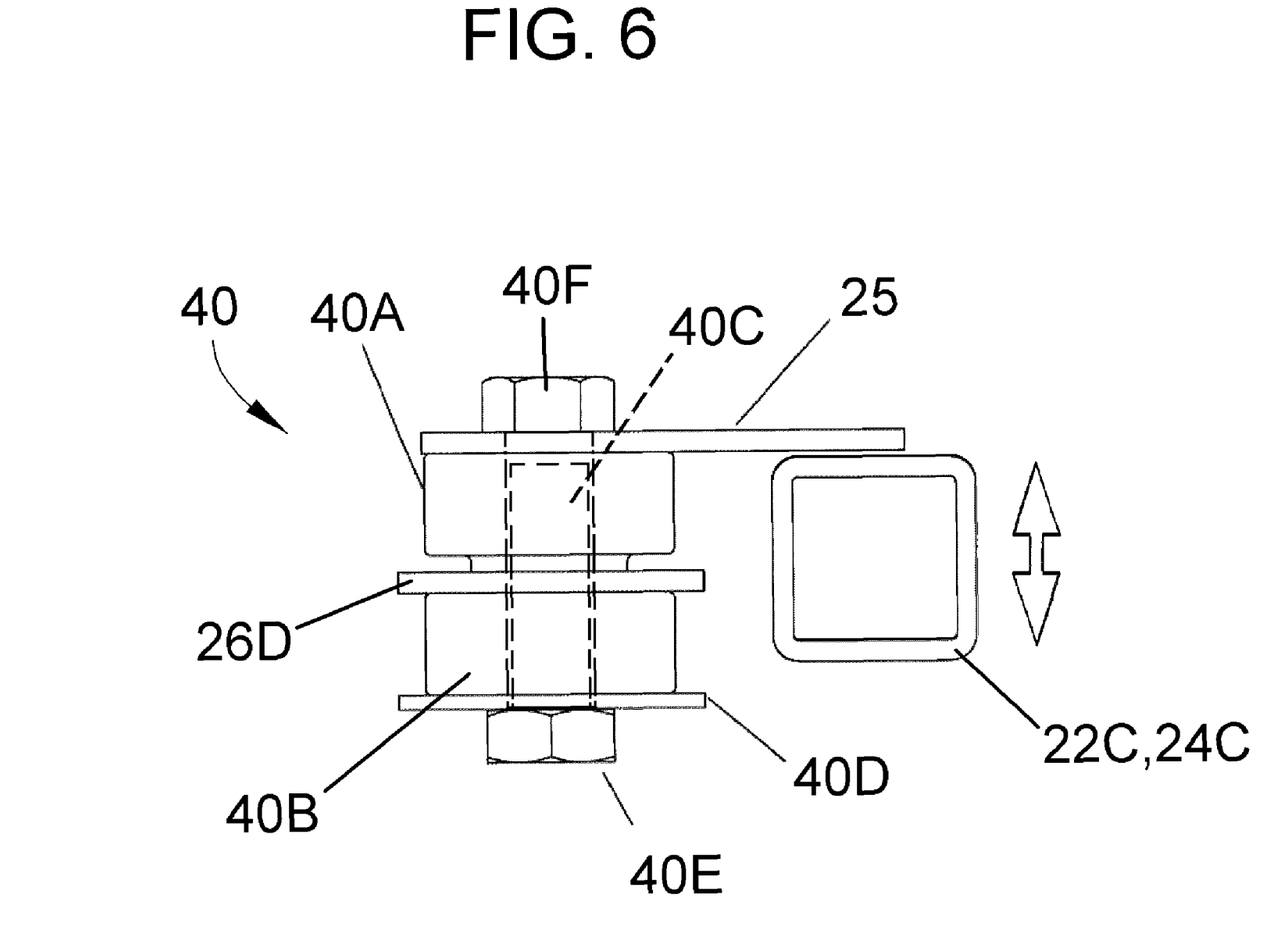
FIG. 6 is a detailed view of a combination damper-limiter-biasing device of the drive-steering control system of FIGS. 3 through 5.

In the embodiment of FIG. 5, the coupling mechanism 26 comprises a housing 26A having lefthand and righthand pairs of plates 26B, with each pair of plates 26B having coaxially aligned holes that are offset from the aligned holes of the other pair of plates 26B. The holes accommodate bearings 26C, for example, bronze flange bearings, that journally support the lever shafts 22B and 24B in the aforementioned offset parallel arrangement. The shafts 22B and 24B can be retained in the housing 26A by E-clips (not shown) or any other suitable fastening device. The gears 22E and 24E of the levers 22 and 24 mesh so that rotation of one lever 22/24 causes an opposite rotation of the other lever 24/22. The housing 26A can be constructed of any suitable material and in any suitable manner to provide a desired orientation for the levers 22 and 24. Furthermore, the housing 26A could be built into the frame of the vehicle 50, rather than as a separate component attached to the section frame 28. In addition, counter-operating mechanisms other than the gears 22E and 24E could be employed, for example, any gear or bevel in an open differential with a center differential cover, and bevel gears operably connected by a movable third bevel gear (similar to a differential) that enables the levers 22 and 24 to be selectively synchronized or independently operated. Other synchronizing means are also foreseeable, such as an external linkage system, a cable and pulley system, a push/pull cable system, a belt and pulley system, a roller chain and sprockets system, a hydraulic system, or a combination of these possibilities.

The housing 26A also has left and a right housing brackets 26D welded thereto and coupled to the limiter units 40 associated with the lefthand and righthand levers 22 and 24. In the preferred embodiment, each limiter unit 40 is a multipurpose device that also provides a biasing effect and a damping effect, in addition to limiting the rotation of its lever 22/24. An example of a commercial-available product that can be used for each limiter unit 40 is a Universal Mount part number 60166, with a static load rating of about 20 psi (about 2900 N/mm$^2$), manufactured by Tech Products Corporation of Dayton Ohio. The Universal Mount comprises an elastomeric ring 40A, elastomeric bushing 40B bonded to a center metal spacer 40C, and a snubbing washer 40D. The ring 40A is inserted between the bracket 25 and the housing bracket 26D, a reduced-diameter portion of the bushing 40B is inserted through a hole in the housing bracket 26D, a bolt 40E is inserted through the snubbing washer 40D, the spacer tube 40C of the bushing 40B, and a hole in the bracket 25, and a lock nut 40F secures the limiter unit 40 to the housing bracket 26D and the bracket 25 of the lever 22/24. The spacer tube 40C limits the rotation of the lever 22/24 (indicated by a double-headed arrow in FIG. 6) and, in conjunction with the ring 40A and bushing 40B, damps the motion of the lever 22/24 and biases the lever 22/24 to a non-steering position.

Other types of systems capable of providing the desired limiting, biasing, and/or damping effect are also foreseeable. For example, each of these effects can be achieved mechanically or hydraulically with cylinders, springs, etc. Furthermore, the limiting, biasing, and/or damping effect can be fixed or adjustable, and coupled to the steering cable system 36 or the mechanism that applies the braking effect to the drive wheels (e.g., the brake drums 32 and bands 38 of FIG. 2), instead of being directly coupled to the steering levers 22 and 24. Lastly, it should be understood that a limiting, biasing, and/or damping effect is preferred but an optional aspect of the invention.

Figure 4:
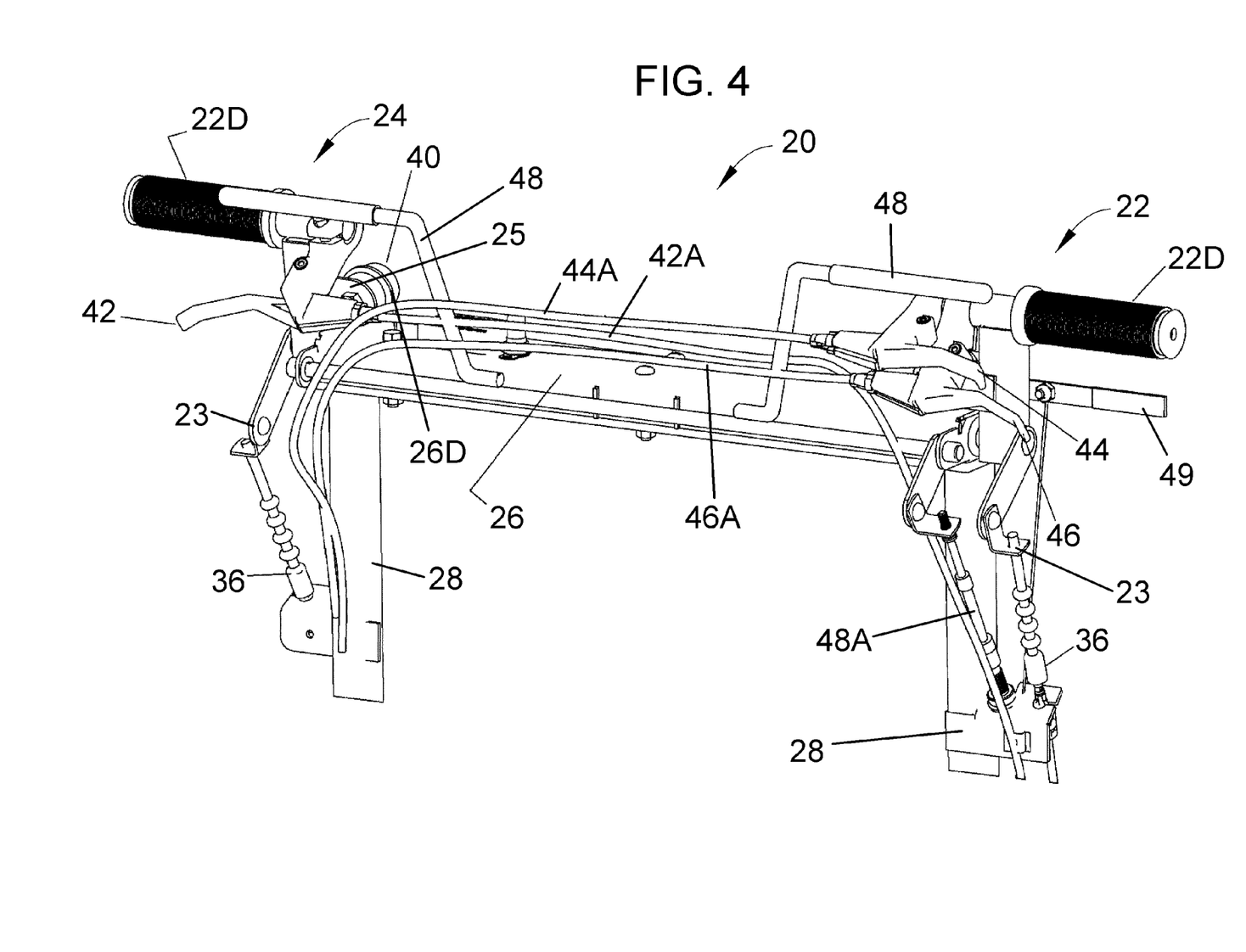
FIG. 4 is a partial perspective view detailing steering input levers of the drive-steering control system of FIG. 3.

FIGS. 4 and 5 depict multiple additional demand input levers as being mounted in the vicinity of the steering input levers 22 and 24. For example, a speed input lever 42 is shown adjustably mounted on the righthand steering input lever 24 in a conveniently operable position that enables an operator to operate the speed input lever 42 with his/her right hand without requiring the operator to remove his/her hand from the righthand steering input lever 24. The input lever 42 and its control cable 42A can be of any suitable type, including those commercially available for operating control cables in vehicles of the type shown in FIG. 3. The speed input lever 42 can be coupled by the cable 42A to a throttle input of a motor or engine 54 mounted on the vehicle 50 (FIG. 3). A suitable example is a GX200URH2 internal combustion engine distributed by Honda Power Equipment Group, Alpharetta, Ga. USA, which has a built-in centrifugal clutch. As engine speed is increased, the centrifugal clutch engages and transmits power by means of a v-belt to an input pulley 34A (FIG. 7) on the transmission 34. A suitable example for the transmission is a gear-driven differential transaxle identified as Peerless 855 manufactured by Tecumseh Power, Charlotte, N.C., USA, preferably equipped with a neutral safety switch for operating a neutral safety starting module, an example of which is commercially available from Delta Systems Inc. of Cleveland Ohio USA, as well as others. Alternatively, if the transmission 34 is a hydrostatic transaxle, such as the LT-0510 manufactured by Hydro-Gear of Sullivan, Ill., USA, a swash plate input of the hydrostatic transaxle can be operated by the speed input lever 42 via a push-pull cable to control both forward and reverse speeds. A vertical-shaft internal combustion engine, such as the Honda GXV160 distributed by Honda Power Equipment Group, can power the hydrostatic transaxle by means of a belt and pulleys. The swash plate input may include damping, limiting and biasing means, such as a hydraulic damping cylinder and a biasing device available from Hydro-Gear.

FIG. 4 also shows a brake lever 44 adjustably mounted on the lefthand steering input lever 22, again in a conveniently operable position that enables the operator to operate the brake lever 44 with his/her left hand while the hand remains on the lefthand steering input lever 22. The brake lever 44 can be coupled by a control cable 44A to a braking system, for example, band service brakes (not shown), associated with the non-drive wheels 56 on the rear sulky 18 of the vehicle 50. Other suitable braking systems are also within the scope of the invention.

Other demand input levers that may be mounted in the vicinity of the steering input levers 22 and 24 will depend on the particular type of vehicle. In the embodiment shown in which the vehicle 50 is a ride-on self-propelled lawn care vehicle 50, other controls would include levers for controlling the flow of dry and liquid fertilizers, herbicides, insecticides, etc. For example, a third lever 46 shown in FIGS. 4 and 5 as adjustably mounted on the lefthand steering input lever 22 may be used to control a liquid sprayer, for example, by operating a ball valve (not shown) through another cable 46A. As with the other levers 42 and 44, the lever 46 is positioned so that the operator can operate the lever 46 with his/her left hand while it remains on the lefthand steering input lever 22.

A pair of levers 48 are shown pivotally mounted to the coupling mechanism 26 and positioned near both levers 22 and 24 for operating a push-pull cable 48A that controls the opening and closing of a door to a hopper (52 in FIG. 3) containing a dry granular material. Finally, an additional lever 49 shown in FIG. 4 selectively controls the operating position of the steering control system 20 by releasing a latch (not shown) that allows the frame section 28 to be rotated forward and rearward. For example, the frame section 28 may be positioned in a forward position while the operator is riding the sulky 18, and rotated rearwardly to allow the operator to continue operating the control system 20 after stepping off the back of sulky 18 and while walking behind the vehicle 50.

Still other demand input levers can be mounted in the vicinity of the steering input levers 22 and 24 that allow their operation by the operator without removing his/her hands from the levers 22 and 24. While represented as operating cables, additional levers contemplated by the invention can use various other actuation components, including commercially-available lever-operated hydraulic master cylinders, rotatable demand input handgrips (for example, motorcycle throttles), and various other levers and devices capable of operating a cable, rod, hydraulic slave cylinder, or other type of mechanical or hydraulic system. Additionally, such demand input devices may be capable of being selectively locked in a particular setting, selectively locked to prevent motion in one direction, and comprise paired levers on either side of the levers 22 and 24 and operatively connected, for example, to permit the operator to push the rear lever of the pair forward to cause forward motion of the vehicle 50 or pull back on the front lever of the pair to cause backward motion of the vehicle 50.

The steering input levers 22 and 24, coupling mechanism 26, and cable system 36 can be provided in the form of a kit for installation on and retrofitting an existing vehicle with a conventional steering system, or installed as original equipment on a vehicle specifically designed to make use of the steering control system 20 of this invention.

Figure 7:
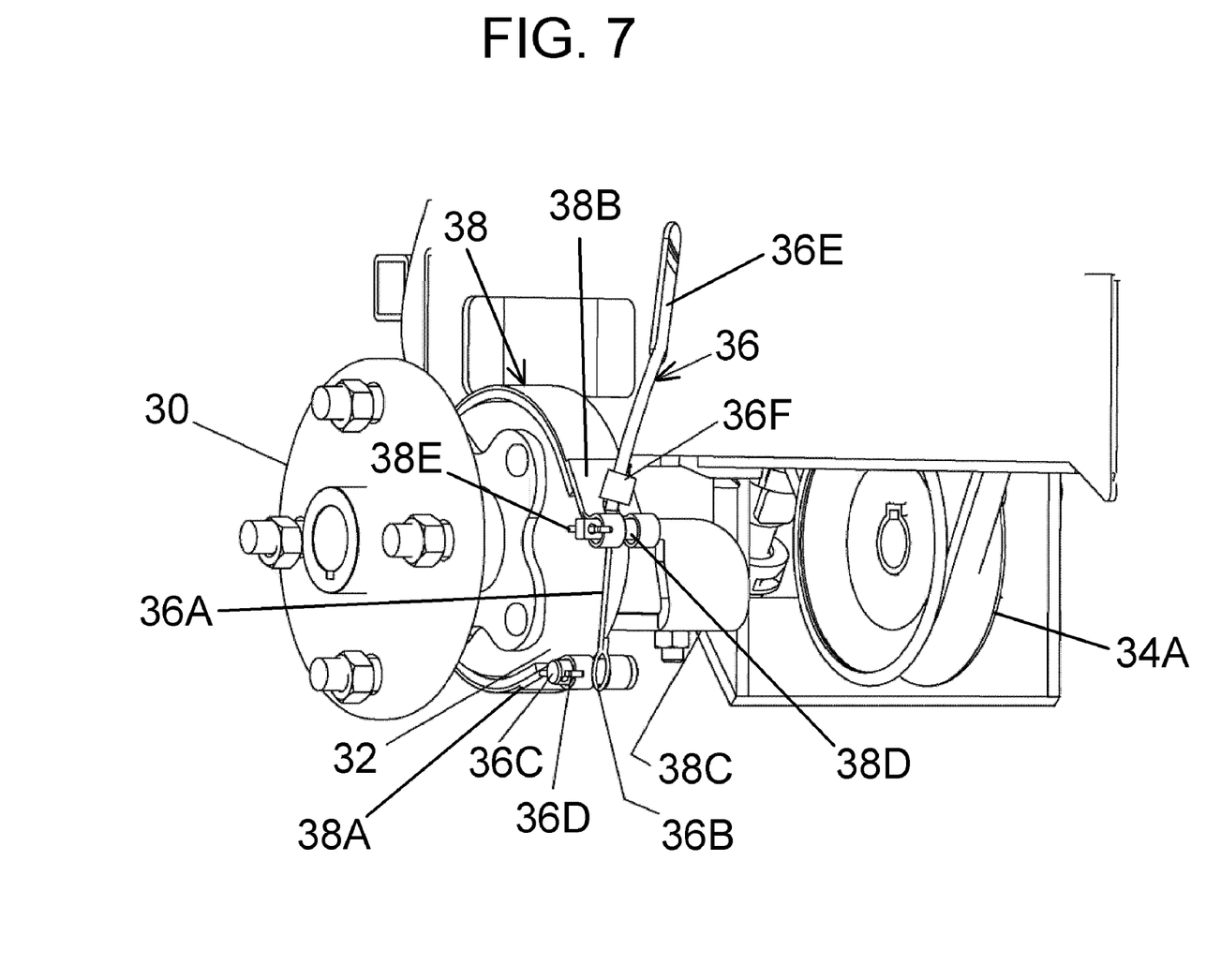
FIG. 7 is a partial perspective view detailing a brake mechanism for use with the drive-steering control system of FIGS. 3 through 6.

As evident from FIG. 2, the steering control system 20 further includes or is otherwise intended to work in combination with a mechanism capable of selectively reducing the propulsion provided by a pair of drive wheels 14 or other propulsion devices, such as multiple drive wheels, tracks, propellers, etc. Similar to FIG. 2, a particular example of a propulsion-reducing device for the vehicle 50 of FIG. 3 is represented in FIG. 7 as a brake drum assembly comprising a drum 32 and band 38. FIG. 7 depicts the brake drum assembly located on the lefthand side of the vehicle 50, though it should be understood that the brake drum assembly on the righthand side of the vehicle 50 will generally be a mirror image of FIG. 7.

The lefthand steering input lever 22 is in operable communication with the lefthand brake band 38 via the steering cable system 36. One end of the cable 36A can be adjustably coupled to the lefthand bellcrank 23 with, for example, a threaded stud and adjusting nut (FIG. 4), while the other end of the cable 36A is connected by an eyelet 36B to the brake band 38. As commonly constructed, the brake band 38 is wrapped around the brake drum 32, resulting in the band 38 being C-shaped with adjacent formed connecting ends 38A and 38B. A clevis pin 36C passes through the connecting end 38A of the brake band 38 and the eyelet 36B. A cotter pin 36D secures the clevis pin 36C to the brake band 38. The sheath 36E of the cable system 36 has a sheath stop 36F in communication with a slot in the connecting end 38B of the brake band 38 and a brake band plate 38C. The brake band plate 38C has a pin 38D formed therein inserted through the connecting end 38B, and a cotter pin 38E secures the brake band 38 to the brake band plate 38C. The brake drum 32 is attached to the wheel hub 30, which is mechanically and rotatably attached to the left propelling output shaft of the transmission (not shown, corresponding to 34 in FIG. 2) of the vehicle 50. A suitable example for the transmission is the aforementioned Peerless 855 manufactured by Tecumseh Power. As conventional, the rim and tire 14 (FIG. 3) are attached to the wheel hub 30, providing the ground-engaging propulsion for the vehicle 50.

While FIG. 7 represents an exemplary braking and propulsion system for the drive-steering control system 20 of this invention, other suitable braking systems and transmission/transaxle systems are also foreseeable. For example, the invention could utilize gear or hydrostatic transmissions, disk or drum brakes (externally mounted or internally mounted within a transaxle), power transmissions with clutches and with or without brakes (externally mounted or internally mounted within a transaxle), tracks or multiple lefthand and righthand drive wheels, etc.

Figure 8:
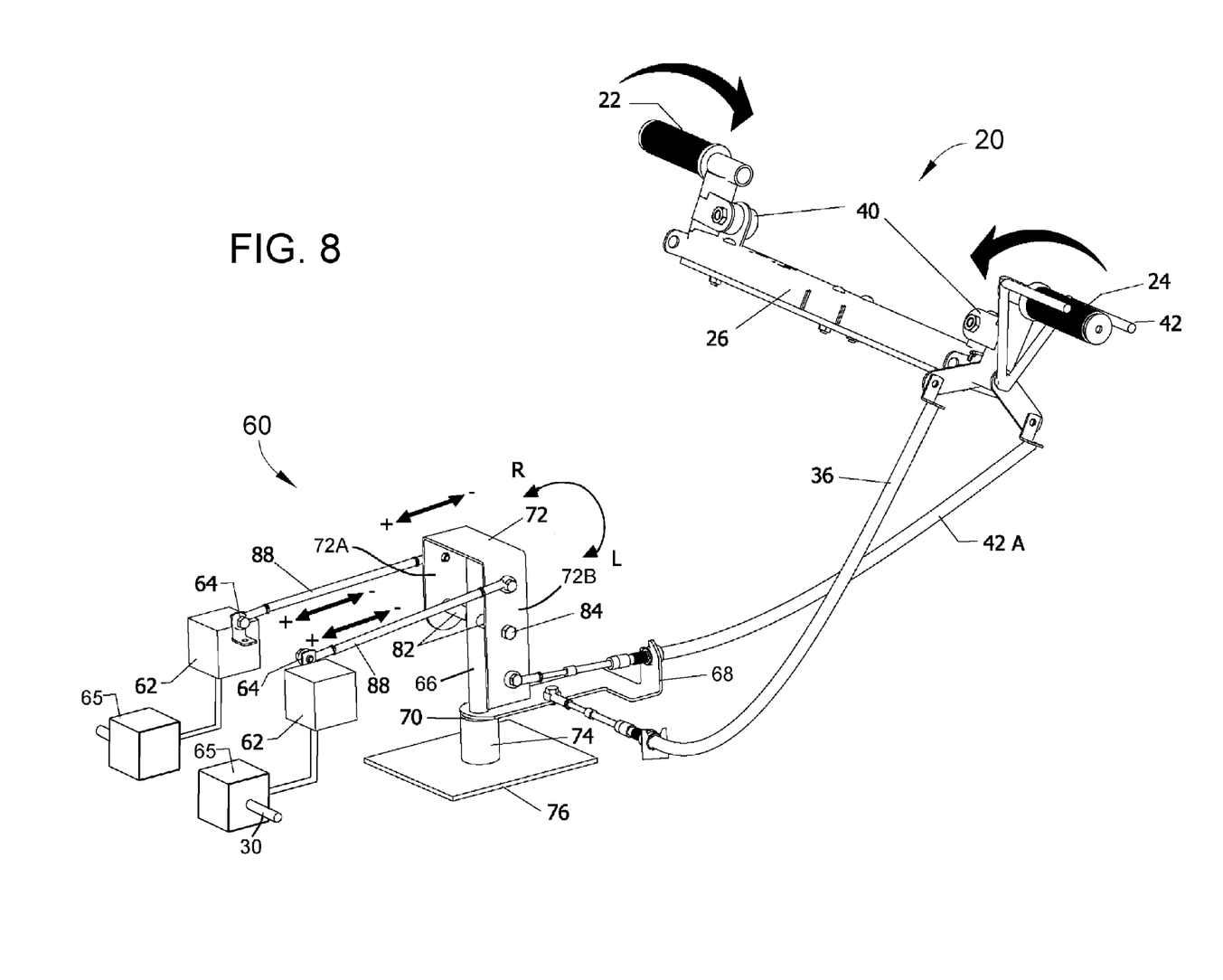
FIG. 8 is a schematic perspective view of a vehicle drive-steering control system in accordance with another embodiment of this invention.

FIG. 8 schematically represents an alternative embodiment for the drive-steering control system 20 of this invention. In the embodiment of FIG. 8, a vertical-shaft internal combustion engine (not shown), such as the aforementioned Honda GXV160, is operably connected by belts and pulleys to a twin variable-displacement hydraulic pump and motor system 60, which effectively replaces the transmission 34 represented in FIG. 2 and the braking system represented in FIG. 7. In particular, FIG. 8 depicts a pair of variable-displacement hydraulic pumps 62, each with a swash plate input 64 in operable fluid communication with a fixed-displacement hydraulic wheel motor 65. Examples of suitable variable-displacement hydraulic pumps and fixed-displacement hydraulic motors include, respectively, the PG series and HGM series manufactured by Hydro-Gear. The travel of each swash plate input 64 is preferably limited by the limiter unit 40 and damped and biased in a neutral non-steering position, for example, using hydraulic damping (not shown) and return-to-neutral biasing (not shown), which are commercially available from manufacturers such as Hydro-Gear. The output of each pump 62 is coupled to one of the drive wheels 14 of the vehicle 50 via its associated fixed-displacement hydraulic wheel motor 65 and hub 30 (corresponding to the wheel hubs 30 of FIG. 2). As known in the art, the lefthand and righthand pumps 62 and their motors could be replaced by variable-displacement hydrostatic transmissions, such as the EZT series manufactured by Hydro-Gear.

The system 60 further includes a steering control column 66 attached to a steering bracket 68, which together form an assembly that rotates about a vertical axis of the column 66. The column 66 and steering bracket 68 are supported by an E-clip 70 on a bearing block 74 containing, for example, a bronze flange bearing (not shown). The bearing block 74 is secured to the frame 76 of the vehicle 50, and the lower end of the steering control column 66 extends through the bearing block 74 and a hole (not shown) in the frame 76, and is retained with another E-clip (not shown).

A U-shaped control bracket 72 is horizontally rotatably mounted on a bolt 84 that passes through a horizontal hole in the steering control column 66. Spacers 82 on the bolt 84 align the control bracket 72 to the steering control column 66. Bearings (not shown), such as bronze flange bearings, are preferably provided at the pivot points of the holes in the steering control column 66 and control bracket 72. Connecting rods 88 operably connect the swash plate inputs 64 to respective lefthand and righthand legs 72A and 72B of the control bracket 72.

Vertical rotational steering motion of the steering control column 66, steering bracket 68, and control bracket 72 is controlled with the lefthand and righthand steering input levers 22 and 24, which can be essentially identical or otherwise functionally equivalent to the levers 22 and 24 of FIGS. 2 through 6 and counter-operating as a result of a coupling mechanism 26 that can be essentially identical or otherwise functionally equivalent to the mechanism 26 of FIGS. 2 through 6. A steering push-pull cable system 36 operably connects the steering bracket 68 to a bellcrank associated with the righthand steering input lever 24, so that push and pull actions transmitted from the levers 22 and 24 through the cable system 36 cause vertical rotational steering motion of the control bracket 72 via the control column 66. A separate directional/speed control cable system 42A operably connects the control bracket 72 to a bellcrank associated with a directional/speed input lever 42 (corresponding to the input lever 42 of FIGS. 2 through 6). To eliminate binding and provide an adjustment capability, each end of the steering push-pull cable system 36, connecting rods 88, and directional/speed control cable system 42A can comprise a ball-joint linkage, as illustrated for the ends of the cable systems 36 and 42A coupled to the steering and control brackets 68 and 72, respectively. A suitable example of a ball-joint linkage is Part No. 6058K41 available from McMaster-Carr, Chicago, Ill. USA. While only the ends of the cable systems 36 and 42A coupled to the steering and control brackets 68 and 72 are illustrated in FIG. 8 as being equipped with ball-joint linkages, it should be understood that the ends of the cable systems 36 and 42 coupled to the bellcranks of their respective levers 24 and 42 would be similarly equipped.

Pushing the directional/speed input lever 42 forward causes the control bracket 72 to rotate about the horizontal axis of the bolt 84 in the direction corresponding to the (+) side of the arrow, thereby equally pushing the lefthand and righthand connecting rods 88 (in the (+) direction of their respective arrows) and rotating the lefthand and righthand swash plate inputs 64 to provide equal forward propulsion to the lefthand and righthand drive wheels 14 via the pumps 62. As a result, the vehicle 50 travels in a straight line at a speed proportional to the amount of driver input provided to the directional/speed input lever 42. In comparison, as the directional/speed input lever 42 is pulled rearward, the control bracket 72 rotates about the horizontal axis of the bolt 84 in the (−) direction of its arrow to equally pull the lefthand and righthand connecting rods 88 in the (−) direction of their respective arrows, thereby rotating the lefthand and righthand swash plate inputs 64 to provide equal rearward propulsion to the lefthand and righthand drive wheels 14 via the pumps 62. The result is that the vehicle 50 travels in a straight line rearward at a speed proportional to the amount of driver input provided to the directional/speed input lever 42.

When the vehicle 50 is either in forward or rearward motion as described above and the righthand steering input lever 24 is pulled to the rear or the lefthand steering input lever 22 is pushed forward, the steering control column 66 and control bracket 72 are rotated counter-clockwise (in the R-direction of the arrow), causing the lefthand connecting rod 88 to push and rotate the lefthand swash plate input 64 in the (+) direction of its corresponding arrow to increase the rotational speed output of the lefthand pump 62 to the lefthand drive wheel 14. Simultaneously, rotation of the control bracket 72 causes the righthand connecting rod 88 to pull the righthand swash plate input 64 in the (−) direction of its corresponding arrow and decrease the rotational speed output of the righthand pump 62 to the righthand drive wheel 14. As a result, the vehicle 50 turns to the right at a rate proportional to the rotation of the levers 22 and 24. If the righthand steering input lever 24 is pushed and/or the lefthand steering input lever 22 is pulled, the procedure is reversed and the vehicle 50 turns to the left.

Finally, if the vehicle 50 is at a stop and the righthand steering input lever 24 is pulled rearward or the lefthand steering input lever 22 is pushed forward, the vehicle 50 executes a zero radius turn to the right. Conversely, if the righthand steering input lever 24 is pushed and/or the lefthand steering input lever 22 is pulled, the vehicle 50 executes a zero radius turn to the left.

While the invention has been described in terms of specific embodiments, it is apparent that other forms could be adopted by one skilled in the art. For example, while certain components and embodiments thereof are shown for performing specific functions, including the creation and transmission of certain motions, it is foreseeable that other structures and systems could be used to achieve the same or comparable functions. Therefore, the scope of the invention is to be limited only by the following claims.

The invention claim is:

1. A synchronized two-lever drive-steering control system adapted for off-road or amphibious vehicles capable of traveling in at least a forward direction, the drive-steering control system comprising:

first and second steering input levers, each of the first and second steering input levers being operable to rotate in a forward pivotal direction and an oppositely-disposed rearward pivotal direction;

coupling means for converting and transmitting rotation of the first steering input lever in the forward pivotal direction into rotation of the second steering input lever in the rearward pivotal direction and rotation of the second steering input lever in the forward pivotal direction into rotation of the first steering input lever in the rearward pivotal direction, the coupling means preventing the first and second steering input levers from being simultaneously rotated in the forward pivotal direction and simultaneously rotated in the rearward pivotal direction;

means for reducing propulsion outputs of a first means for propelling a lefthand side of the vehicle and a second means for propelling a righthand side of the vehicle; and means for converting the rotations of the first and second steering input levers into inputs to the reducing means;

wherein the reducing means reduces the propulsion output of the first propelling means when the first steering input lever is rotated in the rearward pivotal direction so that the lefthand side of the vehicle travels at a speed lower than the righthand side of the vehicle and the vehicle turns in a lefthand direction relative to the forward direction of the vehicle, and the reducing means reduces the propulsion output of the second propelling means when the second steering input lever is rotated in the rearward pivotal direction so that the righthand side of the vehicle travels at a speed lower than the lefthand side of the vehicle and the vehicle turns in a righthand direction relative to the forward direction of the vehicle.

2. The synchronized two-lever drive-steering control system according to claim 1, wherein the first and second steering input levers, the converting means, and the reducing means does not articulate the first and second propelling means to alter a steering angle of the first and second propelling means that causes a steering effect of the vehicle.

3. The synchronized two-lever drive-steering control system according to claim 1, wherein the propulsion outputs of the first and second propelling means cannot be simultaneously reduced by operating the first and second steering input levers.

4. The synchronized two-lever drive-steering control system according to claim 1, wherein the propulsion outputs of the first and second propelling means are generated by rotation of the first and second propelling means.

5. The synchronized two-lever drive-steering control system according to claim 4, wherein the reducing means comprises brakes operable to reduce first and second rotational speeds, respectively, of the first and second propelling means.

6. The synchronized two-lever drive-steering control system according to claim 4, wherein the reducing means comprises a twin variable-displacement hydraulic pump and motor system operable to selectively reduce and increase first and second rotational speeds, respectively, of the first and second propelling means.

7. The synchronized two-lever drive-steering control system according to claim 6, wherein the converting means comprises means for causing opposite actions of the reducing means on the first and second propelling means, and the control system further comprises means for causing equal actions of the reducing means on the first and second propelling means.

8. The synchronized two-lever drive-steering control system according to claim 6, wherein the twin variable-displacement hydraulic pump and motor system comprises a first variable-displacement hydraulic pump operably coupled to the first propelling means and a second variable-displacement hydraulic pump operably coupled to the second propelling means.

9. The synchronized two-lever drive-steering control system according to claim 4, wherein the reducing means comprises a variable-displacement hydrostatic transmission.

10. The synchronized two-lever drive-steering control system according to claim 1, wherein the first and second steering input levers, the coupling means, and the converting means constitute a kit for installation on and retrofitting an existing vehicle with a steering system different from the synchronized two-lever drive-steering control system.

11. The synchronized two-lever drive-steering control system according to claim 1, further comprising means for biasing each of the first and second steering input levers to a non-steering position at which the first and second steering input levers do not reduce the propulsion outputs of the first and second propelling means.

12. The synchronized two-lever drive-steering control system according to claim 1, further comprising means for limiting rotation of the first and second steering input levers in the forward and rearward pivotal directions thereof.

13. The synchronized two-lever drive-steering control system according to claim 1, further comprising means for damping the rotational motion of the first and second steering input levers.

14. The synchronized two-lever drive-steering control system according to claim 1, further comprising means for operably attaching the first and second steering input levers and the coupling means to the vehicle.

15. The synchronized two-lever drive-steering control system according to claim 1, further comprising at least one additional demand input device affixed to at least one of the first and second steering input levers and operably connected to a system of the vehicle other than the drive-steering control system.

16. The synchronized two-lever drive-steering control system according to claim 1, wherein the at least one additional demand input device comprises means for controlling the speed of the vehicle.

17. The synchronized two-lever drive-steering control system according to claim 1, wherein the drive-steering control system is installed on the vehicle.

18. The synchronized two-lever drive-steering control system according to claim 17, wherein the vehicle is an off-road land vehicle and the first and second propelling means comprise at least one device chosen from the group consisting of drive wheels and tracks.

19. The vehicle of claim 18.

20. The vehicle of claim 19, wherein the vehicle is configured to enable an operator of the drive-steering control system to stand, sit, walk behind, or selectively occupy more than one position within the vehicle while operating the first and second steering input levers.

21. The vehicle of claim 19, wherein the first and second propelling means comprise a laterally-spaced pair of drive wheels, the vehicle comprises a laterally-spaced pair of non-drive wheels, one of the pairs of drive and non-drive wheels defines the rearmost pair of wheels of the vehicle, and the vehicle is configured to enable an operator of the drive-steering control system to stand between the rearmost pair of wheels while operating the first and second steering input levers.

22. The vehicle of claim 21, wherein the vehicle is a ride-on self-propelled lawn care vehicle.

23. The vehicle of claim 19, wherein the vehicle is a ride-on self-propelled lawn care vehicle.

24. The synchronized two-lever drive-steering control system according to claim 17, wherein the first and second propelling means comprise at least one device chosen from the group consisting of drive wheels, tracks, and propellers.

25. The vehicle of claim 24.

26. The synchronized two-lever drive-steering control system according to claim 17, further comprising means for operably attaching the first and second steering input levers and the coupling means to the vehicle, the attaching means being mounted to the vehicle so as to be selectively pivotable in the forward direction and an oppositely-disposed rearward direction of the vehicle.

27. A kit for installing a synchronized two-lever drive-steering control system to retrofit an existing off-road or amphibious vehicle that is capable of traveling in at least a forward direction and has a steering system different from the synchronized two-lever drive-steering control system, the kit comprising:

first and second steering input levers, each of the first and second steering input levers being operable to rotate in a forward pivotal direction and an oppositely-disposed rearward pivotal direction;

coupling means for converting and transmitting rotation of the first steering input lever in the forward pivotal direction into rotation of the second steering input lever in the rearward pivotal direction and rotation of the second steering input lever in the forward pivotal direction into rotation of the first steering input lever in the rearward pivotal direction, the coupling means preventing the first and second steering input levers from being simultaneously rotated in the forward pivotal direction and simultaneously rotated in the rearward pivotal direction; and means for converting the rotations of the first and second steering input levers into inputs to the reducing means.

* * * * *